United States Patent
Davis et al.

(10) Patent No.: US 8,061,975 B2
(45) Date of Patent: Nov. 22, 2011

(54) SLIPRING BUSHING ASSEMBLY FOR MOVEABLE TURBINE VANE

(75) Inventors: Brian Michael Davis, West Chester, OH (US); Billy T. Wood, Cincinnati, OH (US); Kent Gerhard Huber, Lebanon, OH (US); Louis Bruno Lorenzi, Wyoming, OH (US)

(73) Assignee: General Electric Company, Schenectady, NY (US)

( * ) Notice: Subject to any disclaimer, the term of this patent is extended or adjusted under 35 U.S.C. 154(b) by 1117 days.

(21) Appl. No.: 11/848,801

(22) Filed: Aug. 31, 2007

(65) Prior Publication Data
US 2009/0060720 A1  Mar. 5, 2009

(51) Int. Cl.
*F04D 29/56* (2006.01)
(52) U.S. Cl. .......... 415/160; 415/161
(58) Field of Classification Search ........ 415/155, 415/159, 160, 161
See application file for complete search history.

(56) References Cited

U.S. PATENT DOCUMENTS

| | | | |
|---|---|---|---|
| 2,638,295 | A | 5/1953 | Sheets |
| 4,821,758 | A | 4/1989 | Ruis |
| 5,061,195 | A | 10/1991 | Bolen |
| 5,623,821 | A | 4/1997 | Bouiller et al. |
| 6,474,941 | B2 | 11/2002 | Dingwell et al. |
| 6,619,916 | B1 | 9/2003 | Capozzi et al. |
| 7,121,727 | B2 | 10/2006 | Bruce et al. |
| 2005/0008482 | A1 | 1/2005 | Allford et al. |
| 2008/0087541 | A1 | 4/2008 | Dellaert et al. |

*Primary Examiner* — Edward Look
*Assistant Examiner* — Dwayne J White
(74) *Attorney, Agent, or Firm* — David J. Clement, Esq.; Trego, Hines & Ladenheim, PLLC

(57) ABSTRACT

A bushing assembly for a turbine vane includes a bushing and a housing. The bushing includes a bore for receiving a trunnion of the vane, a first electrical contact carried on an outer surface thereof, and a first conductor extending from the first electrical contact. The first electrical contact is adapted to be connected to a heater element disposed on the vane. The housing is positioned over the bushing and rotatable relative to the bushing. The housing includes a second electrical contact disposed in contact with the first electrical contact and a second conductor extending from the second electrical contact for connection to an electrical power source.

22 Claims, 8 Drawing Sheets

SLIPRING BUSHING ASSEMBLY FOR MOVEABLE TURBINE VANE

STATEMENT REGARDING FEDERALLY SPONSORED RESEARCH AND DEVELOPMENT

The U.S. Government may have certain rights in this invention pursuant to contract number N00019-04-C-0093 awarded by the Department of the Navy.

BACKGROUND OF THE INVENTION

This invention relates generally to variable inlet guide vanes for gas turbine engines and more particularly to bushings for such vanes.

Gas turbine engines often include airfoil-shaped inlet guide vanes for directing inlet flow to a downstream fan or compressor. In some applications the inlet guide vanes have a variable effective angle in order to throttle mass flow through the engine as needed in different operating conditions.

Portions of the engine near its forward end, including the inlet guide vanes, are subject to ice accretion in some flight conditions. This ice is typically removed by directing heated bypass air on or through the inlet guide vanes. Unfortunately, use of bleed air directly impacts engine efficiency and requires relatively heavy high-temperature pipes and valving.

It is known to use electrical heating for de-icing, for example using slip rings to transfer electrical current from a helicopter rotor head to the rotor blades. However, variable inlet guide vanes must react significant gas loads not present in other applications and thus must be firmly supported at their points of rotation, making delivery of electrical current more difficult. Furthermore, the guide vane bushings must be packed into a tight physical space.

BRIEF SUMMARY OF THE INVENTION

These and other shortcomings of the prior art are addressed by the present invention, which provides an inlet guide vane bushing that allows for the rotational degree of freedom of the inlet guide vane so as to provide unimpeded operation of the inlet guide vane, and provides an electrical current to a heater element to provide ice protection to the inlet guide vane.

According to one aspect of the invention, a bushing assembly for a turbine airfoil which is pivotable about a trunnion includes: a bushing having a bore for receiving the trunnion, a first electrical contact carried by an outer surface thereof, and a first conductor extending from the first electrical contact and adapted to be connected to a heater element disposed on the airfoil; and a housing positioned over the bushing and rotatable relative to the bushing. The housing has a second electrical contact disposed in contact with the first electrical contact, and a second conductor extending from the second electrical contact for connection to an electrical power source.

According to another aspect of the invention, an airfoil assembly for a gas turbine engine includes: a turbine airfoil pivotally connected to an outer casing of the turbine engine; a bushing assembly carried by the outer casing and positioned over a trunnion of the airfoil so as to transfer gas loads from the airfoil to the outer casing, the bushing assembly including: a bushing having a first bore which receives the trunnion, a first electrical contact carried by an outer surface of the bushing, and a first conductor extending from the first electrical contact; a housing which receives the bushing for rotation therein, the housing having a second electrical contact which engages with the first electrical contact, and a second conductor extending from the second electrical contact for electrical connection to an electrical power source; and a heater element disposed on an outer surface of the airfoil and electrically connected to the second conductor via the bushing assembly.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
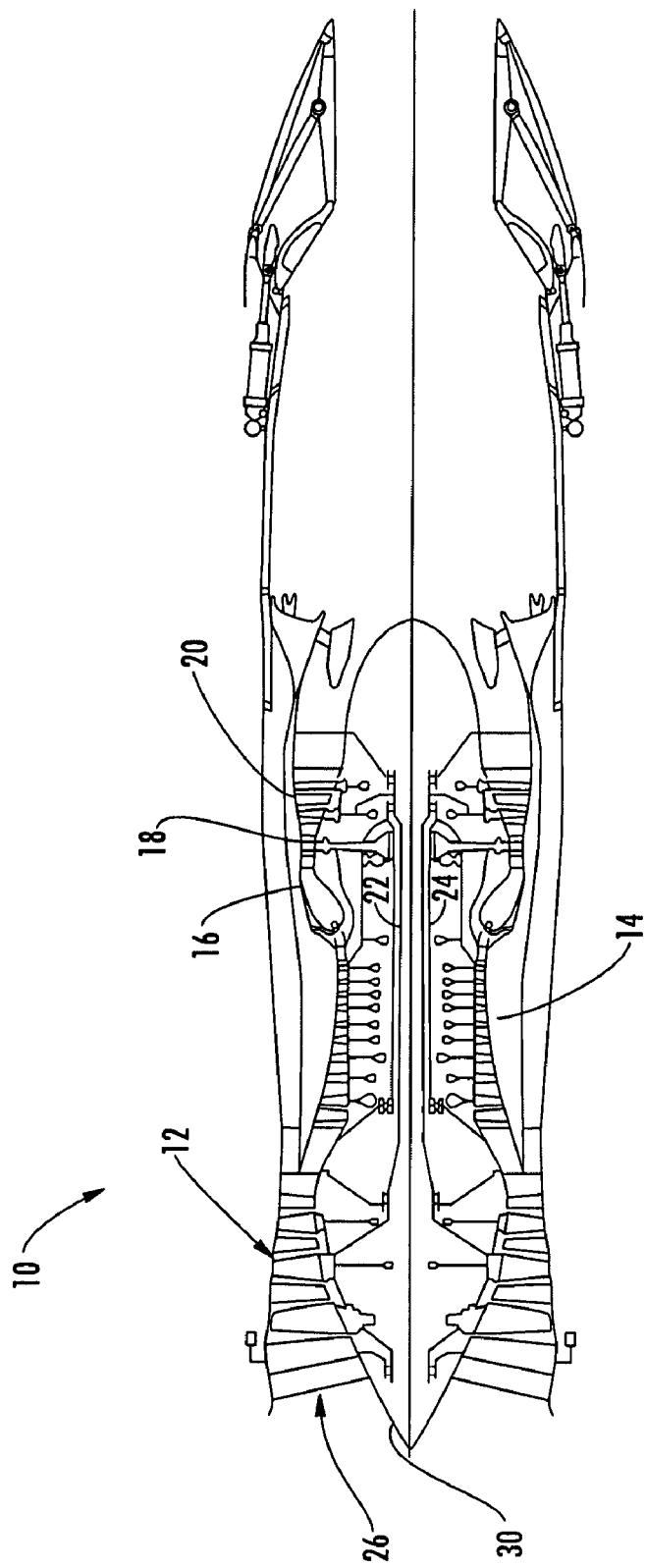
FIG. 1 is a cross-sectional view of a gas turbine engine including an inlet guide vane assembly constructed according to the present invention.

Referring to the drawings wherein identical reference numerals denote the same elements throughout the various views, FIG. 1 shows a gas turbine engine 10 having a fan assembly 12, a high pressure compressor 14, a combustor 16, a high pressure turbine 18, and a low pressure turbine 20, all arranged in a serial, axial flow relationship. The fan assembly 12 and the low pressure turbine 20 are coupled by a first shaft 22, and the compressor 14 and the high pressure turbine 18 are coupled by a second shaft 24.

A plurality of circumferentially-spaced inlet guide vane assemblies 26 are positioned at an inlet of the engine 10 and extend between an outer casing 28 (shown in FIG. 2) and a center hub 30 to direct airflow entering the engine 10 downstream to the compressor 14. While the invention will be described with respect to an inlet guide vane assembly, it will be understood that the principles thereof may be applied to any airfoil or portion thereof in a gas turbine engine which is pivotable.

In operation, air flows through the inlet guide vane assemblies 26 and fan assembly 12 via an air flowpath defined by the center hub 30 and the outer casing 28, such that compressed air is supplied from the fan assembly 12 to the high pressure compressor 14. The highly compressed air is then delivered to combustor 16. Airflow from the combustor 16 drives rotating turbines 18 and 20 and then exits the gas turbine engine 10.

Figure 2:
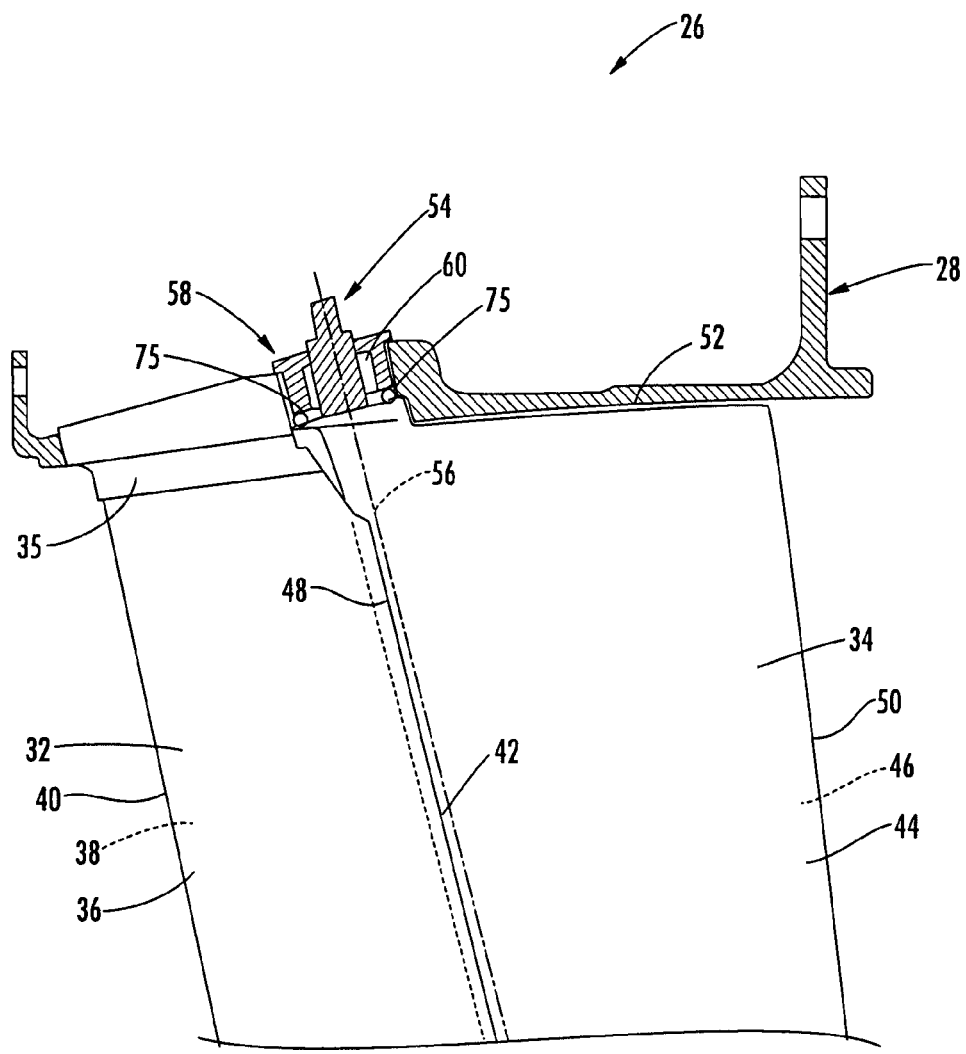
FIG. 2 is a partial side view of an inlet guide vane assembly.

As shown in FIG. 2, each inlet guide vane assembly 26 includes both an airfoil-shaped strut 32 and an airfoil-shaped flap 34. Struts 32 are spaced about a circumference of the hub 30 (shown in FIG. 1) and structurally support casing 28 in spaced relation to hub 30. The struts 32 are aerodynamically shaped to direct air entering the engine inlet around strut 32 towards the flap 34. Each strut 32 has a root (not shown), a tip 35, and a pair of sidewalls 36 and 38 that are connected at a leading edge 40 and a trailing edge 42.

A flap 34 is immediately downstream from each strut 32, and each includes a pair of sidewalls 44 and 46 connected at a leading edge 48 and trailing edge 50. Each sidewall 44 and 46 extends in radial span between a root (not shown) and a tip 52. The flaps 34 are pivotally coupled to the outer casing 28 by a trunnion 54 and are rotatable about a trunnion axis 56.

A bushing assembly 58 is positioned over the trunnion 54 between the trunnion 54 and the outer casing 28 to react gasloads from the flap 34. This allows the flaps 34 to be selectively positionable during engine operation to vary an angle of impingement of airflow directed downstream to the fan assembly 12. The bushing assembly 58 may be constructed of any material that will bear the operating loads on the trunnion 54. One example of a suitable material is a composite comprising carbon fiber reinforcing rods in a matrix of polyimide resin. Such composites are sold under the trade name VESPEL CP by E.I. DuPont De Nemours and Company of Wilmington Del., USA.

Figure 3:
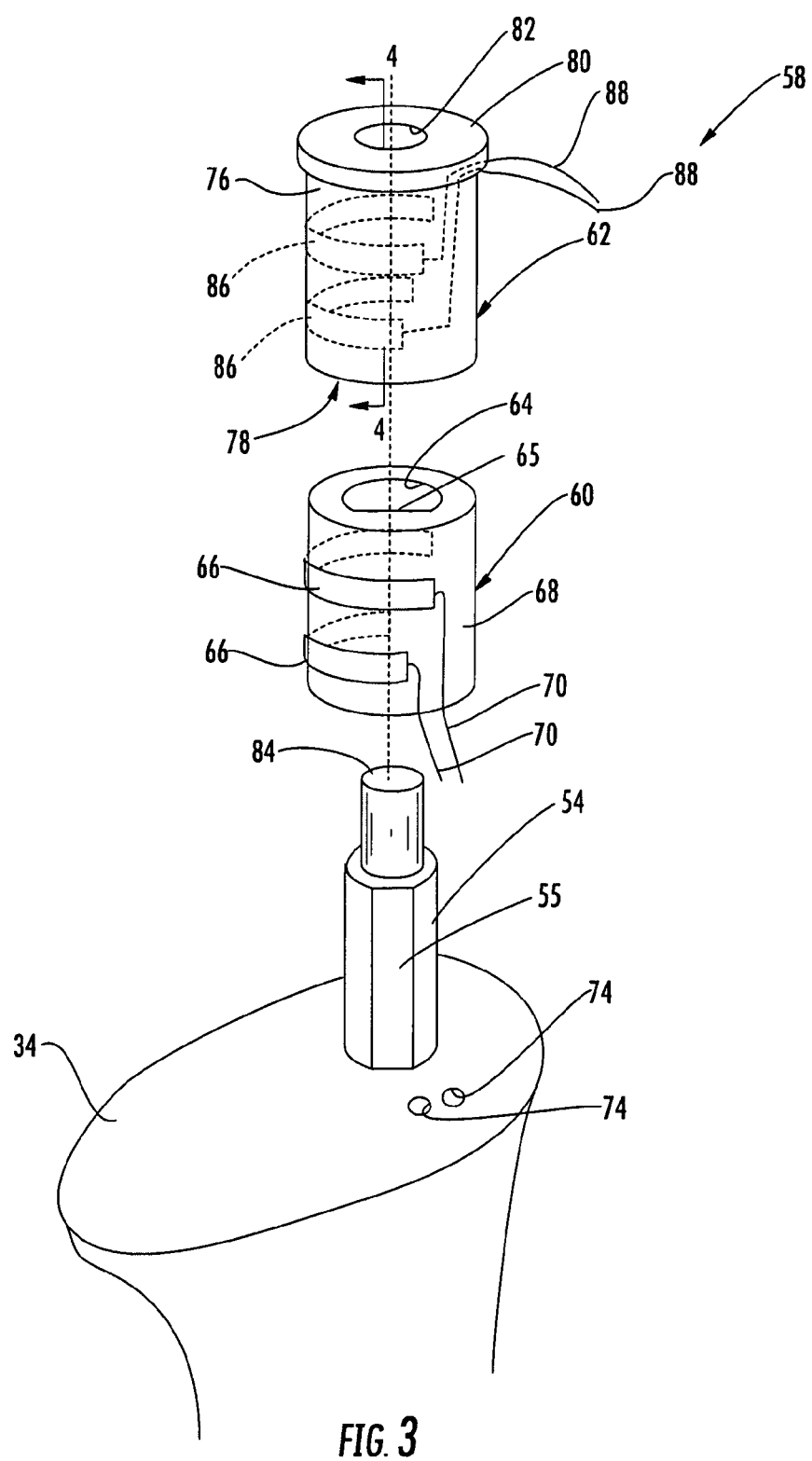
FIG. 3 is an exploded view of a bushing assembly of the inlet guide vane assembly of FIG. 2.
Figure 5:
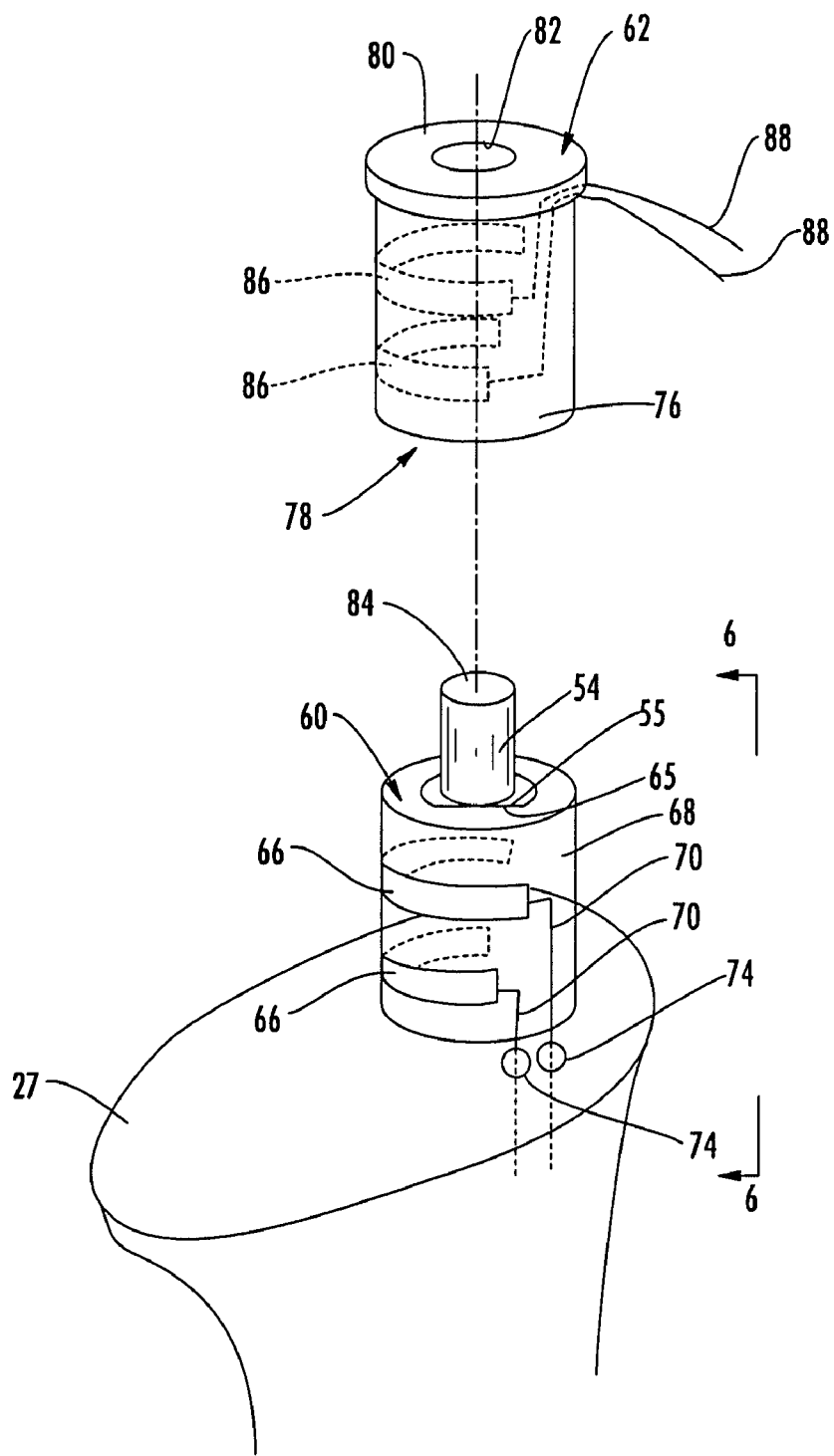
FIG. 5 shows a bushing of the bushing assembly of FIG. 3 positioned on the trunnion of the inlet guide vane.
Figure 6:
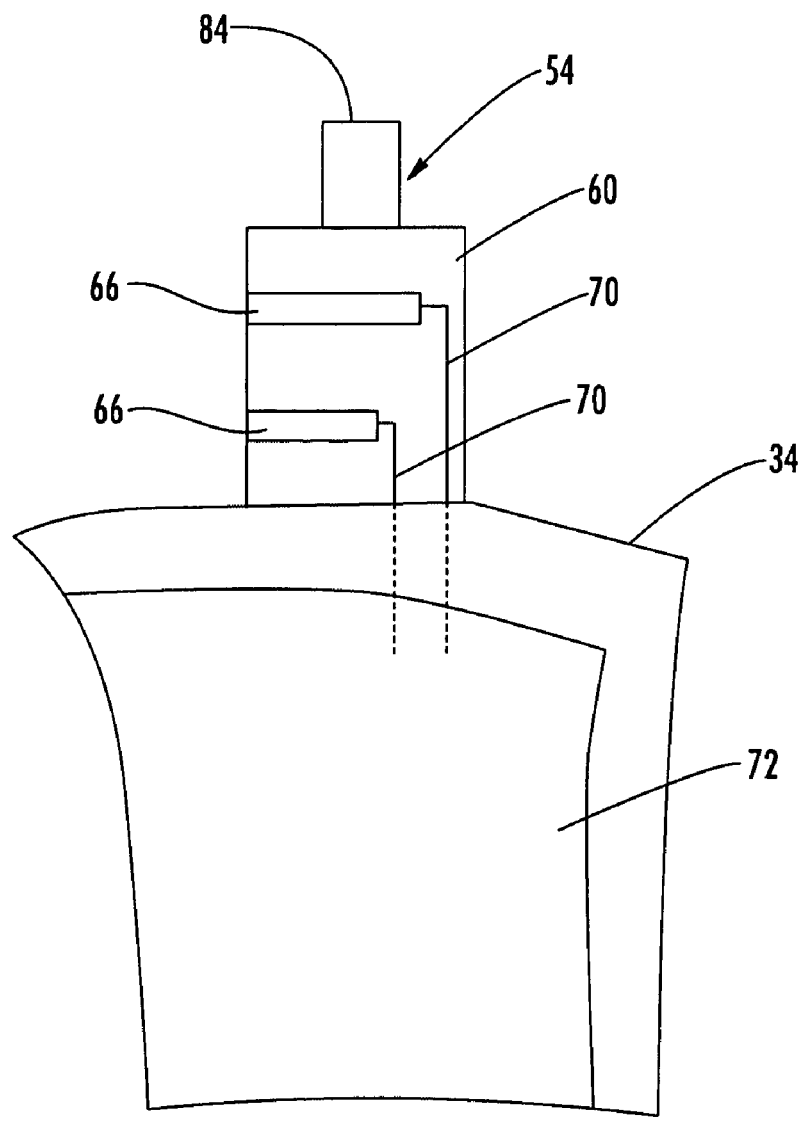
FIG. 6 is a side view of the bushing positioned on the trunnion of the inlet guide vane.

Referring to FIGS. 3 and 5, the bushing assembly 58 includes a bushing 60 and a housing 62. The bushing 60 has a bore 64 therethrough for receiving the trunnion 54. Means are provided for preventing relative rotation between the bushing 60 and the trunnion 54. In the illustrated example the trunnion 54 has a flat 55 formed thereon which engages with a complementary flat 65 of the bushing 60. Alternatively, other known structures such as splines, gear teeth, keys or pins, or the like, could also be used for this purpose. At least one electrical contact 66 is embedded into or mounted on the outer surface 68 of the bushing 60. A corresponding number of electrical conductors 70 extend from the contacts 66 to a known type of heating element 72, shown in FIG. 6, mounted on an external surface of the flap 34. As shown in FIG. 5, the electrical conductors 70 extend into the flap 34 through apertures 74 and pass through the interior of the flap 34 to join the heating element 72. The electrical contacts 66 and conductors 70 are manufactured of a metal or other conductive material suitable for transmitting an electrical current.

Figure 4:
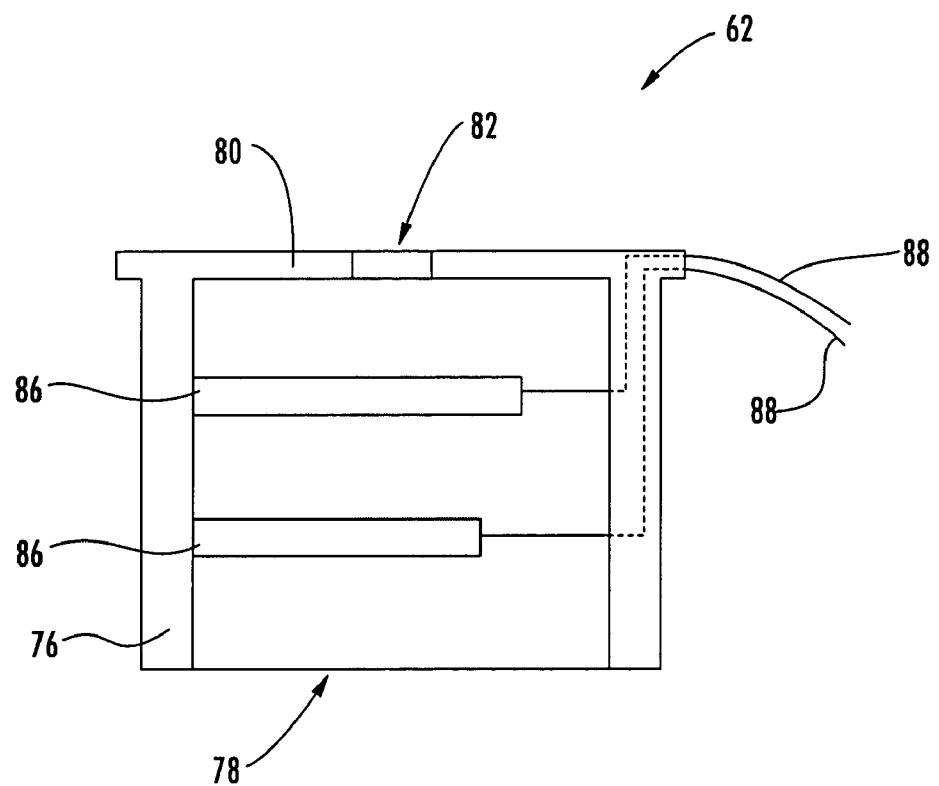
FIG. 4 is a cross-sectional view of a housing of the bushing assembly of FIG. 3.

The housing 62 includes a sidewall 76 with a center bore 78 that receives the bushing 60. The bore 78 is closed off by an endwall 80 that includes an end bore 82 for allowing an end 84 of the trunnion 54 to extend therethrough. At least one electrical contact 86 is embedded into or mounted on the surface of the bore 78 for mating with the electrical contacts 66 of the bushing 60 to provide an electric current path therebetween. As shown in FIG. 4, electrical conductors 88 are routed from the electrical contacts 86 through the housing 62 and exit the housing 62 for connection to a power source via an outboard wiring harness (not shown).

As illustrated, each bushing assembly 58 includes one pair of electrical contact paths for powering a single resistance heater. If desired, additional contact paths may be provided to provide redundancy or to implement zoned heating. Alternatively, a single contact path could be provided with a ground or return path passing through the structure of the trunnion 54 itself.

Any gap between the bushing assembly 58 and the flap 34 is sealed to prevent the entry of water or debris which might interfere with the electrical connections. As shown in FIG. 2, this is done by placing an O-ring 75 between the housing 62 and the flap 34, but other types of seals or gaskets could also be used.

Figure 7:
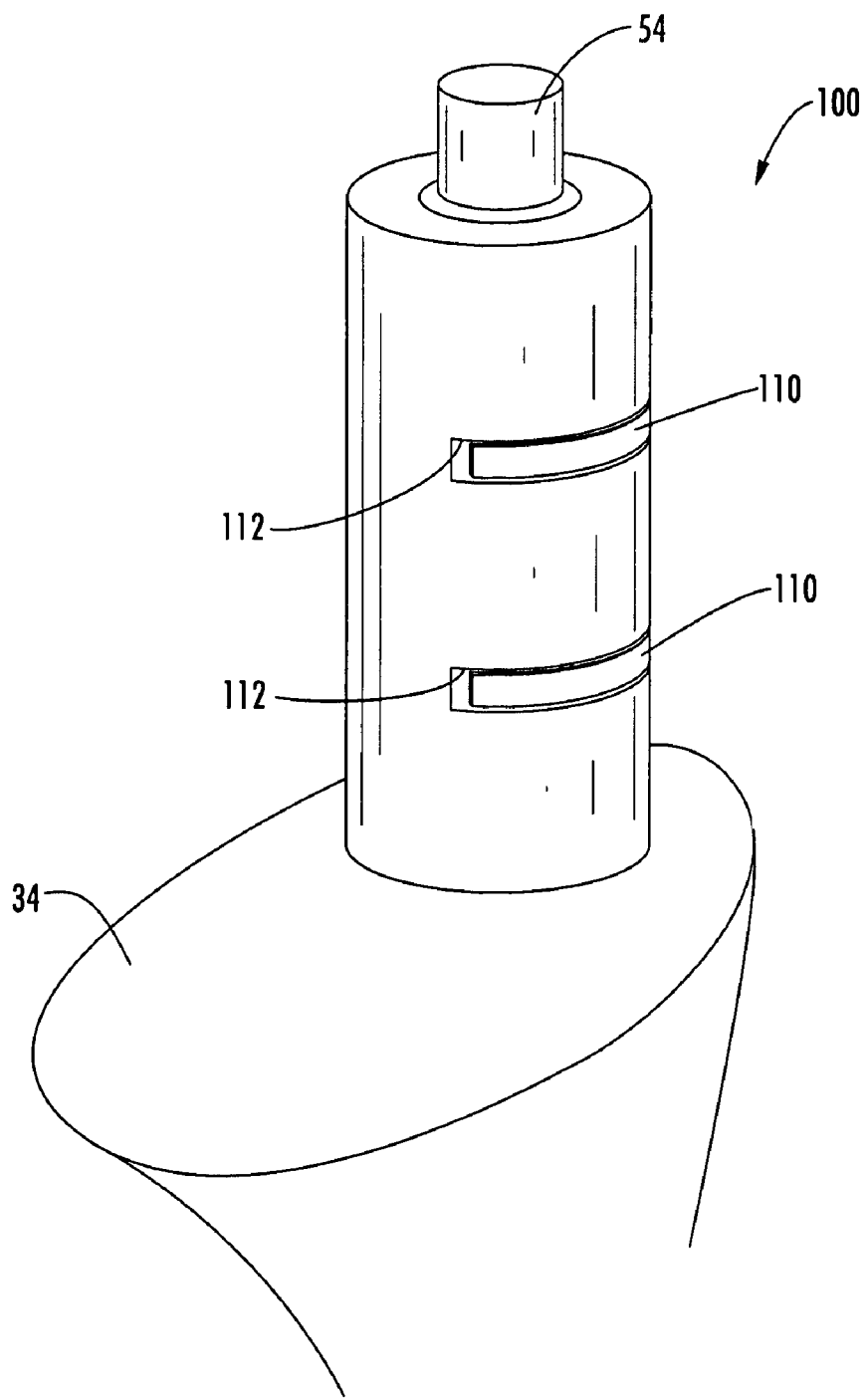
FIG. 7 shows an alternative bushing.

FIG. 7 shows an alternative bushing 100 positioned on a trunnion 54 of the flap 34. The bushing 100 is similar in construction to the bushing 60 except for the arrangement of contacts. It includes a plurality of leaf spring type contacts 110 which are pre-sprung to allow the contacts 110 to apply pressure against contacts 60 of the housing 62. Recesses 112 are formed in the bushing 100 to allow the contacts 110 to be compressed into the recesses 112 by the contacts 60 in the housing 62, such that the contacts 110 reside flush with the outer surface of the bushing 100. Thus, the contacts 110 provide an adjustment mechanism that ensures proper electrical contact between the bushing contacts 110 and the housing contacts 60, despite variances in sizes between the outside diameter of the bushing 100 and the inside diameter of the housing 62 or wear of the contacts 60.

Figure 8:
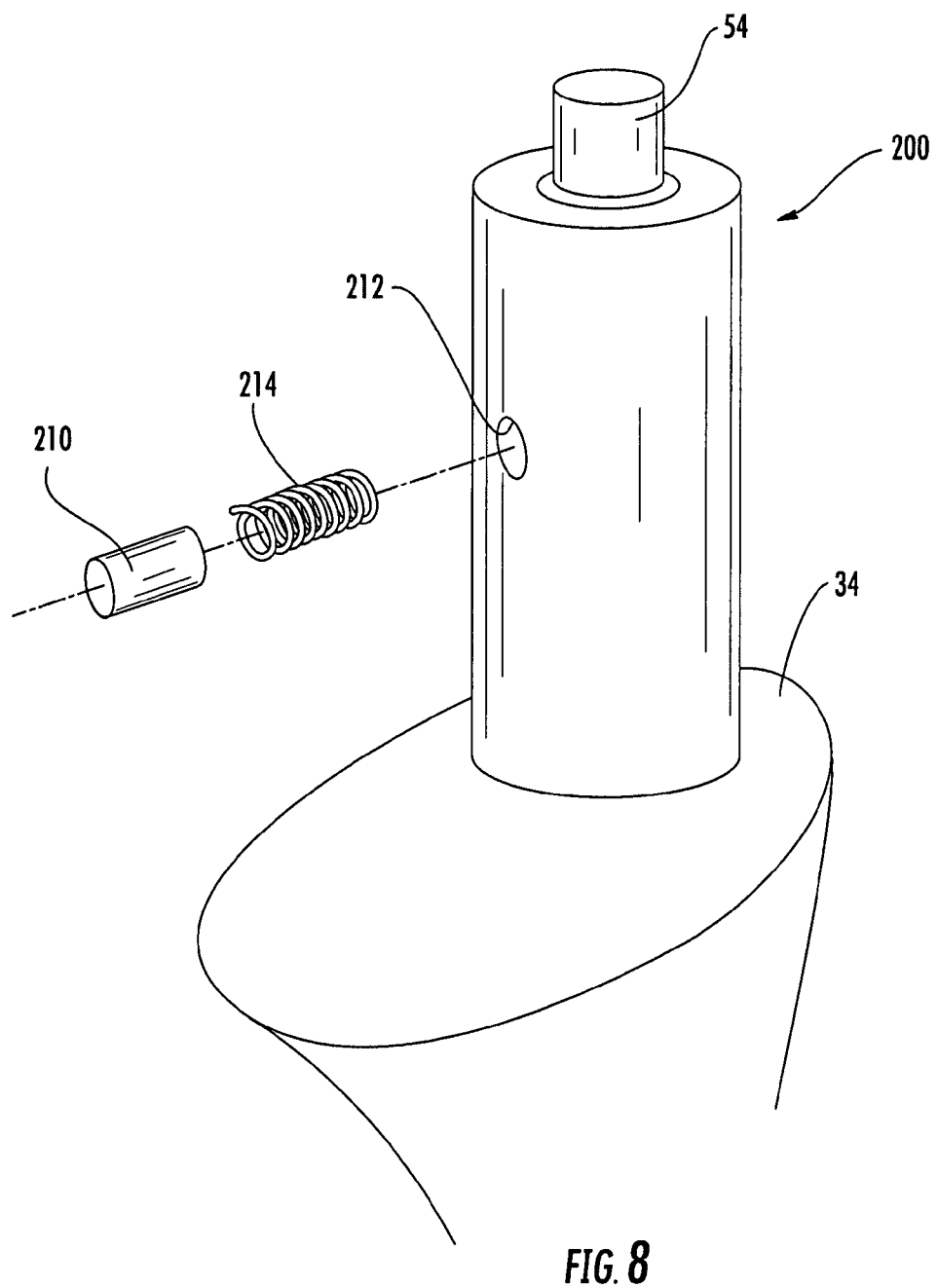
FIG. 8 shows another alternative bushing.

FIG. 8 illustrates another alternative bushing 200 which includes one or more plunger style contacts 210 which are received in an aperture 212 of the bushing 200 and biased outwardly by a spring 214. The spring 214 allows the contact 210 to be moved from an outwardly extending position where the contact 210 is pushed against contacts 60 of the housing 62 to a recessed position within the aperture 212 to allow the housing 62 to be positioned over the bushing 200.

Various combinations of these types of contact may also be incorporated in the housing 62.

The foregoing has described a bushing assembly for a moveable turbine vane. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A bushing assembly for a turbine airfoil which is pivotable about a trunnion, comprising:
    (a) a bushing having a bore for receiving the trunnion, a first electrical contact carried by an outer surface thereof, and a first conductor extending from the first electrical contact and adapted to be connected to a heater element disposed on the airfoil; and
    (b) a housing positioned over the bushing and rotatable relative to the bushing, the housing having a second electrical contact disposed in contact with the first electrical contact, and a second conductor extending from the second electrical contact for connection to an electrical power source.

2. The bushing assembly according to claim 1, wherein the first electrical contact is embedded in the outer surface of the bushing.

3. The bushing assembly according to claim 1, further including a recess formed in the bushing, such that the first electrical contact may be moved between an extended position where the first electrical contact extends outwardly past the outer surface of the bushing and a compressed position where the first electrical contact is compressed into the recess.

4. The bushing assembly according to claim 3, wherein the first electrical contact includes an elongate strip of conductive material having at least one end connected to the bushing.

5. The bushing assembly according to claim 3, wherein the first electrical contact includes a spring positioned in the recess which biases the first electrical contact outwardly past the outer surface of the bushing.

6. The bushing assembly according to claim 1, further including a generally radially-extending aperture formed in the bushing, and wherein the first electrical contact comprises a generally cylindrical plunger received in the aperture and moveable between an extended position where the first electrical contact extends outwardly past the outer surface of the bushing and a compressed position where the first electrical contact is compressed into the recess.

7. The bushing assembly according to claim 1, wherein the housing includes a sidewall defining a first bore for receiving the bushing therein.

8. The bushing assembly according to claim 7, wherein the housing includes an end wall positioned at an end of the sidewall, the end wall including a second bore for receiving a distal end of the trunnion therethrough.

9. The bushing assembly according to claim 7, wherein the second electrical contact is carried on a surface of the first bore.

10. The bushing assembly according to claim 1, further comprising at least a third electrical contact carried by the bushing and a fourth electrical contact carried by the housing, the third and first electrical contacts disposed in electrical contact with each other.

11. An airfoil assembly for a gas turbine engine, comprising:
   (a) a turbine airfoil pivotally connected to an outer casing of the turbine engine;
   (b) a bushing assembly carried by the outer casing and positioned over a trunnion of the airfoil so as to transfer gas loads from the airfoil to the outer casing, the bushing assembly comprising:
      (i) a bushing having a first bore which receives the trunnion, a first electrical contact carried by an outer surface of the bushing, and a first conductor extending from the first electrical contact;
      (ii) a housing which receives the bushing for rotation therein, the housing having a second electrical contact which engages with the first electrical contact, and a second conductor extending from the second electrical contact for electrical connection to an electrical power source; and
   (c) a heater element disposed on an outer surface of the airfoil and electrically connected to the second conductor via the bushing assembly.

12. The airfoil assembly according to claim 11, wherein the heater element is electrically connected to the first electrical contact by the first conductor.

13. The airfoil assembly according to claim 12, wherein the first conductor extends through an interior of the airfoil for connection to the heater element.

14. The airfoil assembly according to claim 11, wherein the bushing assembly allows the trunnion to rotate relative to the outer casing while permitting the transmission of an electric current from an electrical power source to the heater element.

15. The airfoil assembly according to claim 11, wherein the first electrical contact is embedded in the outer surface of the bushing.

16. The airfoil assembly according to claim 11, further including a recess formed in the bushing, such that the first electrical contact may be moved between an extended position where the first electrical contact extends outwardly past the outer surface of the bushing to a compressed position where the first electrical contact is compressed into the recess.

17. The airfoil assembly according to claim 16, wherein the first electrical contact includes an elongate strip of conductive material having at least one end connected to the bushing.

18. The airfoil assembly according to claim 16, wherein the first electrical contact includes a spring positioned in the recess which biases the first electrical contact outwardly past the outer surface of the bushing.

19. The airfoil assembly according to claim 11, further including a generally radially-extending aperture formed in the bushing, and wherein the first electrical contact comprises a generally cylindrical plunger received in the aperture and moveable between an extended position where the first electrical contact extends outwardly past the outer surface of the bushing and a compressed position where the first electrical contact is compressed into the recess.

20. The airfoil assembly according to claim 11, wherein the housing includes a sidewall surrounding the bushing and an end wall positioned at an end of the sidewall, the end wall including a second bore for receiving a distal end of the trunnion therethrough.

21. The airfoil assembly according to claim 11, further comprising at least a third electrical contact carried by the bushing and a fourth electrical contact carried by the housing, the third and first electrical contacts disposed in electrical contact with each other.

22. The airfoil assembly according to claim 11 wherein the airfoil is an inlet guide vane.

* * * * *